March 1, 1938. G. F. JORDAN ET AL 2,109,701
CLUTCH MECHANISM FOR WINDSHIELD WIPERS
Filed March 19, 1936 2 Sheets-Sheet 2
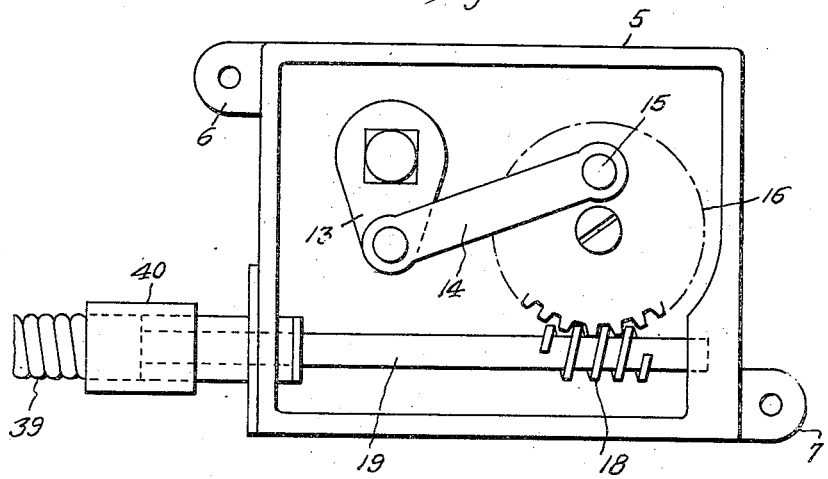
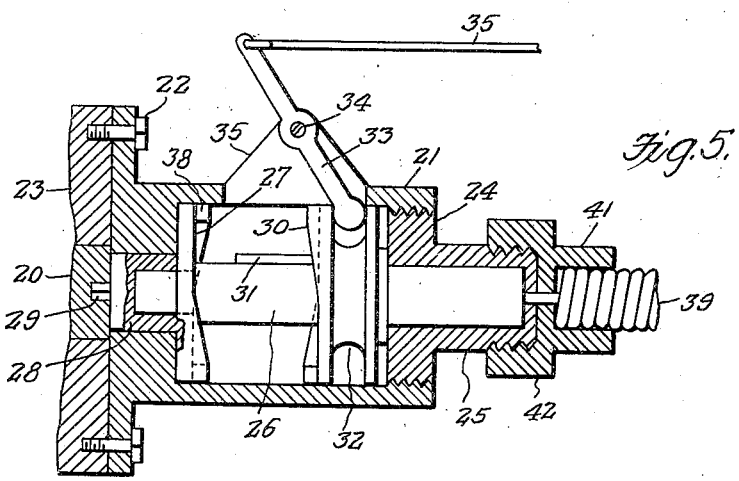
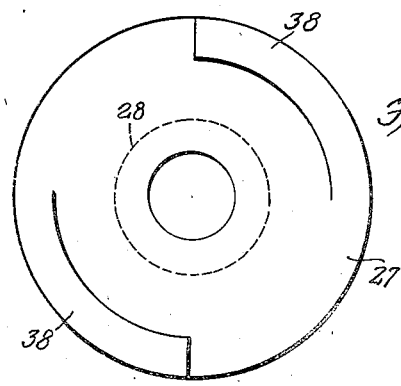
Inventors
G. F. Jordan,
Ed. Mayer Patented Mar. 1, 1938

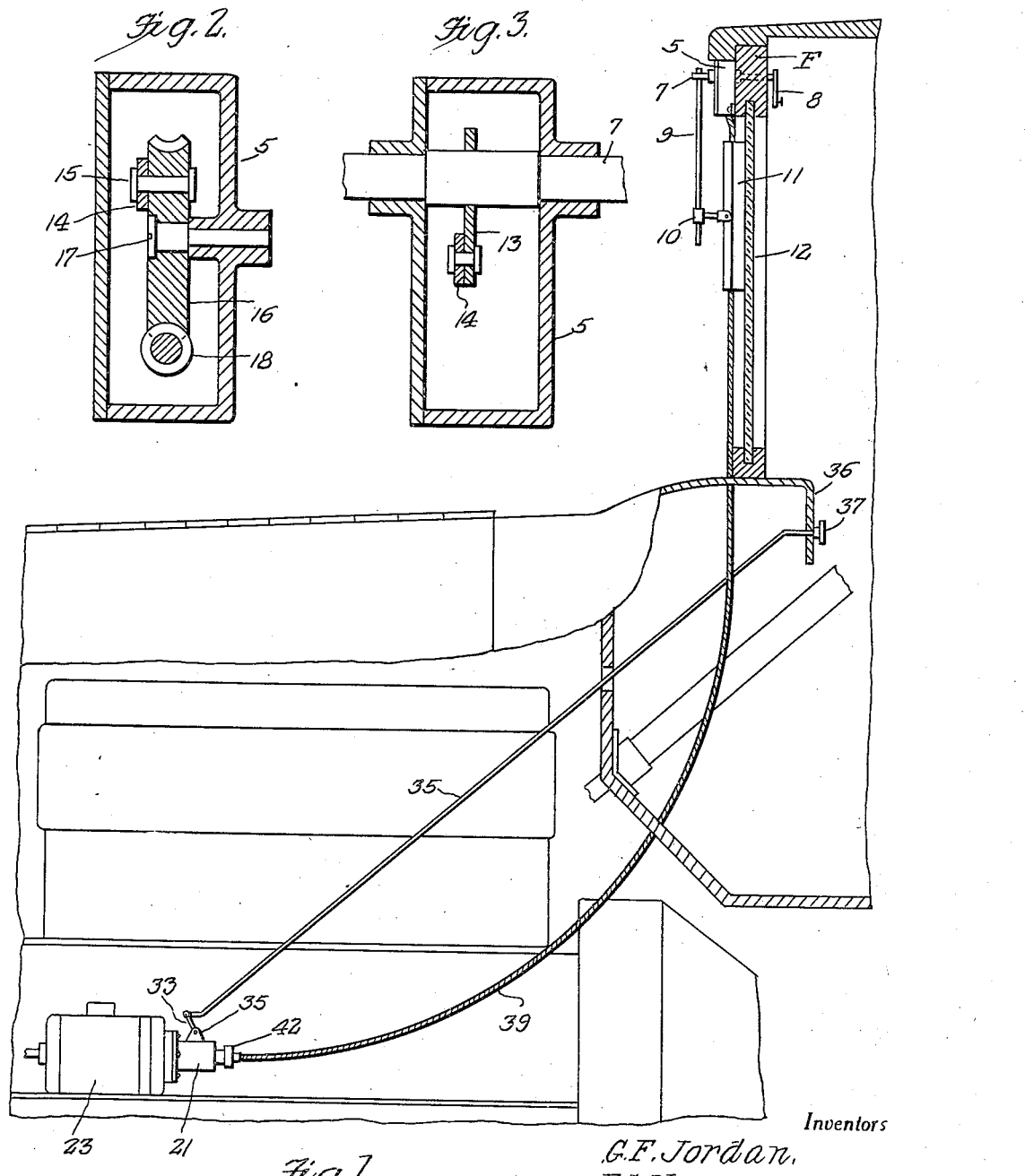

2,109,701

UNITED STATES PATENT OFFICE 2,109,701

CLUTCH MECHANISM FOR WINDSHIELD WIPERS

Guss F. Jordan and Ed Mayer, Butte, Mont.

Application March 19, 1936, Serial No. 69,716

1 Claim. (Cl. 192—67)

This invention relates to windshield wipers and the object of the invention is to provide in a wiper of this character means for insuring a positive operation of the wiper when the same is in actual use.

To that end the invention consists primarily in the provision of improved means for driving or oscillating the wiper, and the invention together with its objects and advantages will be best understood from a study of the following description taken in connection with the accompanying drawings wherein:

Figure 1 is a view illustrating the application of the invention.

Figure 2 is a sectional view taken through a gear housing and the gearing arranged therein.

Figure 3 is a sectional view through the gear housing illustrating certain details hereinafter more fully referred to.

Figure 4 is an elevational view looking at the gear housing from the open side thereof and illustrating certain features hereinafter more fully referred to.

Figure 5 is an enlarged detail sectional elevational view showing the connection between the generator shaft and a flexible driven shaft, and the clutch for controlling the drive between said shafts and Figure 6 is a face view of one of the clutch members.

Referring to the drawings by reference numerals it will be seen that in the preferred embodiment thereof the windshield wiper comprises a gear casing 5 provided with suitable apertured flanges or ears 6 and 6' through the medium of which and suitable fastening elements said housing is secured in proper position on the frame F of the windshield in a manner suggested in Figure 1.

Extending transversely through the housing 5 is a shaft 7 one end of which extends through the frame F and is provided at said end with a suitably equipped arm 8 adapted for the attachment thereto, when desired, of an auxiliary wiper or squeegee attachment (not shown).

To the outer end of the shaft 7 there is secured in any suitable manner the wiper arm or rod 9 to which is secured in a conventional manner and as indicated generally at 10 the squeegee 11 which is adapted for wiping engagement with the outside surface of the windshield 12 as is conventional.

Within the housing 5 shaft 7 is provided with a squared portion to which is secured an arm 13 that is connected through the medium of a pitman arm 14 with an eccentric pin 15 provided on a gear 16.

Gear 16 is suitably rotatably supported within the housing 5 as at 17 and is in mesh with a worm 18 provided on a shaft 19 also suitably journalled in the housing 5.

In accordance with the present invention mechanism is provided for driving the shaft 19 from the generator shaft 20. To this end therefore there is provided a clutch casing 21 which at one end is provided with an apertured flange through the medium of which and suitable securing elements 22 said casing 21 is secured to the casing 23 of the generator in the manner clearly shown.

Threaded in the free end of the clutch casing 21 is a disk 24 carrying a bearing 25 in which is journalled one end of a shaft 26.

In positive driven engagement with the shaft 20 and housed within the clutch casing 21 is a clutch disk 27 provided with a hub 28 that at one end has a squared pin extension 29 that fits within a squared socket in the adjacent end of the generator shaft 20 to the end that clutch disk 27 is caused to revolve with the shaft 20.

Hub 28 of the clutch disk 27 is also provided with a bearing socket in which is journalled the reduced end of shaft 26 shown in Figure 5.

Splined to the shaft 26 for rotation therewith, and for axial movement relative thereto is a shiftable clutch disk 30 that is connected with the shaft 26 in the manner and for the purpose mentioned as indicated generally at 31.

Clutch disk 30 has a hub portion formed with a groove 32 which receives one end of a lever 33 that is pivoted intermediate its ends as at 34 between ears 35 that extend upwardly from the casing 21. Connected with the free end of the lever or arm 33 is a push and pull rod 35 that extends upwardly and rearwardly through the instrument panel 36 of the automobile and at the end thereof working through the opening provided therefor in the panel 36 the push and pull rod 35 is provided with a knob 37 to facilitate the manual manipulation thereof. It will thus be seen that by pulling on the rod 35 clutch element 30 will be caused to move toward the left in Figure 5 and engage the clutch element 27 to the end that shaft 26 will be placed in driven engagement with the generator shaft 20.

While the clutch elements 27 and 30 may be of any suitable structure or design we have shown the same as being in the form of disks the confronting faces of which are provided with complemental lugs 38 that cooperate to place the driving and driven elements 27, 30 of the clutch in positive driving engagement one with the other and in a manner thought to be apparent.

At its free end shaft 26 is suitably connected with one end of a flexible shaft 39 that in turn is coupled through the medium of a suitable coupling 40 with one end of the shaft 19 for transmitting drive from the shaft 26 to the shaft 19, and in this connection, it will be apparent that drive from the shaft 19 is transmitted through the gears 16, 18, eccentric 15, pitman 14, and arm 13 to the shaft 7 for oscillating the wiper or squeegee 11 to the end that the latter will move in the arc of a circle and in wiping engagement with the windshield 12 for maintaining a clear vision area on the windshield.

When it is not desired to use the windshield wiper rod 35 is pushed in to the position shown in the drawings whereupon clutch element 30 is moved to the position shown in Figure 5 thus interrupting the drive connection between shaft 20 and shaft 26.

Referring again to Figure 5 it will be seen that at the joint or connection between shaft 26 and 39 there is provided for the shaft 39 a cap member 41 formed on one end of a nut 42 that is threadedly engaged with the free end of the bearing 25 projecting from the disk 24.

From the above it will be seen that I have provided a windshield wiper which may be readily connected with and driven from the shaft of the generator of an automobile to the end that a positive driving means for the windshield wiper is provided. Consequently in accordance with the present invention the speed at which the wiper oscillates will not be affected, as is now the case, by the variation in loads to which the engine is subjected and consequently the windshield wiper under any and all conditions will operate at a uniform speed thus maintaining a clear vision area on the windshield for the operator under most severe weather conditions.

Having thus described the invention, what is claimed as new is:

A generator drive connection for a windshield wiper comprising a clutch casing mounted on the casing of the generator and having an opening in the side wall thereof, a clutch member having a hub projecting from one face thereof and journaled in one end of the clutch casing, a socketed drive connection between the projected end of the hub and the generator, said clutch member having a central recess extending into the hub, a cap threadedly secured in the outer end of the casing and having a recess therein, a shaft having its opposite ends journaled in said recess of the clutch member and in the recess of the cap, a second clutch member mounted on the shaft in the clutch casing for rotation therewith and for axial movement relative thereto into and out of engagement with the first-named clutch member, said movable member having a collar, a flexible shaft extending through the outer end of the cap and connected to the first-named shaft, said flexible shaft extending from the casing to the wiper, a bracket mounted on the casing adjacent the opening and an operating lever pivoted to the bracket and extending through the opening for engagement with the collar to actuate the movable clutch member.

GUSS F. JORDAN.
ED MAYER.